United States Patent
Berge et al.

(10) Patent No.: US 6,316,519 B1
(45) Date of Patent: Nov. 13, 2001

(54) MOLECULAR WEIGHT CONTROLLED POLYMERS BY PHOTOPOLYMERIZATION

(75) Inventors: Charles Thomas Berge, Rochester Hills, MI (US); Vincent Desobry, Marly (CH)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/367,906

(22) PCT Filed: Jan. 20, 1998

(86) PCT No.: PCT/US98/03133

§ 371 Date: Aug. 19, 1999

§ 102(e) Date: Aug. 19, 1999

(87) PCT Pub. No.: WO98/37104

PCT Pub. Date: Aug. 27, 1998

Related U.S. Application Data

(60) Provisional application No. 60/038,225, filed on Feb. 19, 1997.

(51) Int. Cl.$^7$ .................................. C08F 2/46
(52) U.S. Cl. ................ 522/182; 522/150; 522/153; 522/183; 522/184; 522/188; 522/187; 522/64; 522/18; 522/28
(58) Field of Search .................... 522/182, 183, 522/184, 188, 38, 49, 57, 63, 64, 65, 66, 67, 18, 28, 153, 150, 187

(56) References Cited

U.S. PATENT DOCUMENTS

| | | | |
|---|---|---|---|
| 4,665,106 | * 5/1987 | Ohta et al. ............................. | 522/49 |
| 5,385,996 | * 1/1995 | Rizzardo et al. .................... | 526/240 |
| 5,391,406 | * 2/1995 | Ramharack et al. ................ | 427/516 |
| 5,773,543 | * 6/1998 | Rizzardo et al. .................... | 526/215 |
| 5,874,511 | * 2/1999 | Rizzardo et al. .................... | 526/286 |
| 5,932,675 | * 8/1999 | Rizzardo et al. .................... | 526/289 |
| 6,100,350 | * 8/2000 | Wilczek et al. ..................... | 526/82 |

FOREIGN PATENT DOCUMENTS

95/12568 * 5/1995 (WO) .

OTHER PUBLICATIONS

Marcomolecules (1995), 196 (7), 2349–2360. New Chain Transfer Agents for Radical Polymerization Based on the Addition–Fragmentation Mechanism.*

Marcomolecules, 1996, 29, 7717–7726. Chain Transfer Activity of w–Unsaturated Methyl Methacrylate Oligomers.*

Journal of Polymer Science: Part A: Polymer Chemistry, vol. 34, 1415–1420 (1996). Synthesis of Epoxy Terminated Polymers by Radical Polymerization Using (t–Butylperoxymethyl)stryene as Chain Transfer Agent.*

Polymer Journal, vol. 24, No. 3, pp 281–290 (1992). Control of Molecular weight and End Group of Polymer by Addition Fragmentation Reaction with a–(Bromomethyl)acrylate and Allyl Bromide.*

Macromolecular Chemistry and Physics. 197, 3027–3042 (1996).*

Marcomolecules, 1991, 24, 3689–3695. Use of Substituted Allyic Sulfides to Prepare End–Functional Polymers of Controlled Molecular Weight by Free–Radical Polymerization.*

Chemical Abstracts, vol. 115 (12), 1991, p. 71. Photocurable compositions and manufacture of pressure sensitive adhesives.*

T. Corner, Free Radical Polymerisation. The Synthesis of Graft Copolymers, *Advances in Polymer Science* 62, 95–142, 1984.

Colombani et al., Addition–Fragmentation Processes in Free Radical Polymerization, *Prog. Polymer Sci.*, 21, 429–503, 1996.

* cited by examiner

*Primary Examiner*—James J. Seidleck
*Assistant Examiner*—Sanza L. McClendon
(74) *Attorney, Agent, or Firm*—James A. Costello; Sudhir G. Deshmukh

(57) ABSTRACT

Synthesis of linear acrylic polymers and copolymers having controlled molecular weight by the photoinitiated free radical polymerization of vinyl monomers in the presence of chain transfer agents to produce polymers useful in coating compositions and the like, including printing inks.

17 Claims, 1 Drawing Sheet

MOLECULAR WEIGHT CONTROLLED POLYMERS BY PHOTOPOLYMERIZATION

This appln is a 371 of PCT/US98/03133 filed Jan. 20, 1998 which claims benefit of Prov. No. 60/038,225 filed Feb. 19, 1997.

BACKGROUND OF THE INVENTION

This invention relates to a method of synthesizing linear acrylic polymers and copolymers having controlled molecular weight based on photo-initiated free radical polymerization of vinyl monomers in the presence of chain transfer agents.

Synthesis of vinyl polymers by free radical initiated polymerization is known in the art. The ability to assemble linear vinyl polymers is complicated by several reaction pathways that are available to the initiation and propagating species. Radical polymerization of vinyl monomers is particularly sensitive to these reactions and are discussed in detail in "Radical Chain Polymerization" in Principles of Polymerization, 2nd Ed., G. Odian, John Wiley & Sons, Inc. (1981). Under certain circumstances, particularly at elevated temperatures, these side reactions can be used very effectively to control vinyl polymer molecular weight (e.g., chain transfer and chain terminators). However, these same processes are the source of defects which alter the properties of the polymer. Their impact on polymer properties is amplified as the molecular weight of the polymer decreases. Therefore, control of these side reaction is desirable. T. Corner in "Free Radical Polymerization: The Synthesis of Graft Copolymers", Adv. Polym. Sci., 1984, C2. 95, discusses how one can produce polymers with fewer defects. Low reaction temperature is a predominant factor in reducing the unwanted chain transfer and chain termination processes.

Thermal-initiated polymerization require initiators which decompose upon heating. There is a lower temperature limit for any thermal initiator below which it becomes ineffective in initiating polymerization. Very low temperature thermal initiators are not practical because of safety concerns relating to their instability under polymerization conditions.

Redox initiators are used at low temperature to polymerize vinyl monomers. Ionic redox initiator are ineffective for organic solution processes due to solubility issues. The organic soluble redox initiators contain chemical moieties which cause yellowing of the polymer or make the polymer more susceptible to oxidation, e.g., amines and metal accelerators. It is therefore desirable to conduct vinyl polymerizations at temperatures lower than conventionally achievable by these techniques.

Photoinitiated vinyl polymerizations work well at temperatures which are impractical for thermal initiators. The photoinitiators have the organic compatibility needed for effectiveness in solution processes and contain moieties which do not alter the performance of the polymer as do the organic soluble redox systems. Photoinitiators which work effectively at low temperature also produce polymers with fewer defects by virtue of the depression of undesirable transfer and termination reactions.

Control of molecular weight in vinyl polymerizations can be achieved with the minimum of undesirable side reactions by use of specifically designed chain transfer agents (CTAs). In free radical polymerizations, compounds which contain a sulfur-hydrogen (commonly known as a thiol moiety) are good CTAs for moderating molecular weight. They control the polymer molecular weight by hydrogen atom abstraction from the mercaptan by the propagating radical center. See, "Radical Chain Polymerization" in Principles of Polymerization, 2nd Ed, G. Odian, John Wiley & Sons, Inc. (1981). The deficiencies of this class of CTAs are well known to one skilled in the art. Offensive odor and deleterious effects to weathering properties has resulted in a search for other classes of CTAs.

The use of addition-fragmentation agents to control molecular weight are known. These chain transfer agents are effective at controlling molecular weight of vinyl polymers but copolymerize with monomers thus being ineffective as CTAs. As pointed out in "Addition-Fragmentation Processes in Free Radical Polymerization", Colombani, et al., Prog. Polym. Sci., Vol. 21, 439, 1996, and references therein, the chain transfer reaction is favored at elevated temperatures whereas copolymerization is favored at low temperatures. It is then anticipated that this class of CTAs would not be effective in low temperature polymerizations.

It is therefore surprising to find that addition-fragmentation CTAs provide good molecular weight control in acrylic polymerizations initiated by irradiating a photoinitiator and that photoinitiated vinyl monomer polymerization can be employed at relatively low temperatures to synthesize linear polymers.

SUMMARY OF THE INVENTION

This invention is directed to an improved method for photopolymerizing one or more mono-ethylenically unsaturated monomers having the following general structure:

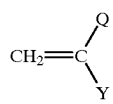

(I)

where Q=H, halogen or $CH_3$ and Y=any group which activates the double bond toward radical addition, by:

i) contacting the monomer with a photoinitiator, ii) contacting the monomer/photoinitiator of step (i) with actinic radiation, and iii) forming a polymer of controlled molecular weight;

where Y is selected from the group consisting of COOR, $CONR_2$, OCOR, CN, Cl, $OCO_2R^1$, $OR^1$, and aryl;

R is selected from the group consisting of hydrogen, alkyl, aryl, aralkyl and alkaryl;

$R^1$ is selected from the group consisting of alkyl, aryl, aralkyl and alkaryl; and wherein each of said groups is optionally substituted with one or more functional groups selected from the group consisting of hydroxy, epoxy, isocyanato, acid, amino, and silyl;

the improvement which comprises employing an addition-fragmentation chain transfer agent along with the photoinitiator in step (i).

Contemplated addition—fragmentation chain transfer agents include the following:

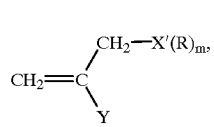

(II)

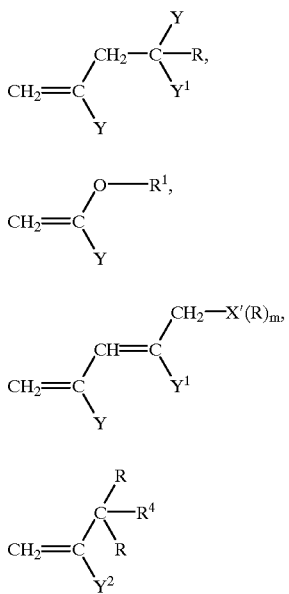

or a vinyl terminated compound of Formula VII:

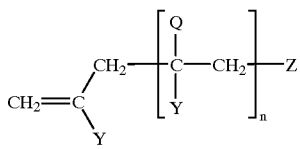

wherein

Y¹ is any group which activates the double bond toward radical addition and is the same or different from Y;

X' is an element other than carbon selected form Groups IV, V, VI or VII of the Periodic Table or a group consisting of an element selected from Groups IV, V or VI to which is attached one or more oxygen atoms; and Y² is halogen or $C(R)_2R^4$;

m is a number from 0 to 3, such that the valency of the group X' is satisfied and, when m is greater than 1, the groups represented by R are the same or different;

Z is hydrogen, $SR^1$, S(O)R, $S(O)_2R$, R, $R^2$, $R^3$;

$R^2$ is derived from initiator fragments;

$R^3$ is a chain transfer agent-derived radical selected from the group consisting of alkyl cycloalkyl, aryl, aralkyl, alkaryl, organosilyl, alkoxyalkyl, alkoxyaryl, and —$P(R)_2$, each of said groups being optionally substituted with a member selected from the group R, COOR, $CONR_2$, OCOR, CN, halogen, $OCO_2R$, OR;

$R^4$ is chlorine or bromine; and $n \geq 1$.

The actinic radiation includes single or multiple wavelengths in the ultraviolet region of the electromagnetic spectrum. The irradiation of the reaction mixture includes wavelengths from 305 nm to 450 nm, preferably from 335 nm to 400 nm. The polymer formed has a DP of about 2000 or less, preferably a DP of 2 to 200. The term "polymer" as used herein includes copolymers as well.

Preferred monomers are one or more of the following: methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, alpha methyl styrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, functional methacrylate, acrylates and styrene selected from glycidyl methacrylate, 2-hydroxyethyl methacrylate, hydroxypropyl methacrylate (all isomers), hydroxybutyl methacrylate (all isomers), diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), diethylaminoethyl acrylate, triethyleneglycol acrylate, methacrylamide, N-tert-butyl methacrylamide, N-n-butyl methacrylamide, N-methyl-ol methacrylamide, N-ethyl-ol methacrylamide, N-tert-butyl acrylamide, N-n-butyl acrylamide, N-methyl-ol acrylamide, N-ethyl-ol-acrylamide, vinyl benzoic acid (all isomers), diethylamino styrene (all isomers), alphamethylvinyl benzoic acid (all isomers), diethylamino alphamethylstyrene (all isomers), para-methylstyrene, p-vinyl benzene sulfonic acid, trimethoxysilylpropyl methacrylate, triethoxysilylpropyl methacrylate, tributoxysilylpropyl methacrylate, dimethoxymethylsilylpropyl methacrylate, diethoxymethylsilylpropylmethacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, and vinyl butyrate, vinyl chloride, vinyl fluoride, vinyl bromide.

In a preferred process Y, —QYC—CH₂—, Z and "n" are independently selected from one or more of the following:

Y=H, methyl, ethyl, butyl (all isomers), cyclohexyl, methoxy, ethoxy, propoxy, butoxy (all isomers), phenoxy, acetate, propionate, butyrate (all isomers), benzoate, carboxylate, chlorine, bromine, fluorine, iodine, nitrile, amide, N-methylamide, N-ethylamide, N-propylamide, N,N-dimethylamide, N,N-diethylamide, N,N-dibutylamide, N-methyl-N-ethylamide, carboxylate ester of methyl, ethyl, propyl, butyl (all isomers), benzyl, phenyl, 2-hydroxyethyl, 3-hydroxypropyl, 2-hydroxypropyl, 4-hydroxy-butyl (all isomers), 3-hydroxybutyl (all isomers), 2-hydroxybutyl, 3-trimethoxysilylpropyl, 3-triethoxysilylpropyl, 3-tributoxysilylpropyl, 3-tri(isopropoxy)silylpropyl, 2-aminoethyl, 3-aminopropyl, 2-aminopropyl, 4-aminobutyl (all isomers), 3-aminobutyl (all isomers), 2-aminobutyl (all isomers), 2-epoxypropyl, 3-epoxypropyl.

—QYC—CH₂— are derived pharmaceutically from one or more of the following monomers: methyl methacrylate ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, styrene, alpha methyl styrene, glycidyl methacrylate, 2-hydroxyethyl methacrylate, hydroxypropyl methacrylate (all isomers), hydroxybutyl methacrylate (all isomers), diethylaminoethyl methacrylate, triethyleneglycol methacrylate, N-tert-butyl methacrylamide, N-n-butyl methacrylamide, N-methyl-ol methacrylamide, N-ethyl-ol methacrylamide, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, glycidyl acrylate, 2-hydroxyethyl acrylate, hydroxypropyl acrylate (all isomers), hydroxybutyl acrylate (all isomers), diethylaminoethyl acrylate, triethyleneglycol acrylate, N-tert-butyl acrylamide, N-n-butyl acrylamide, N-methyl-ol-acrylamide, N-ethyl-ol acrylamide, vinyl benzoic acid (all isomers), diethylamino styrene (all isomers), p-vinyl benzene sulfonic acid, paramethylstyrene, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, and vinyl butyrate.

$Z=H, SR^1, S(O)R, S(O)_2R, R^2, R^3$;

R=methyl, ethyl, propyl, n-butyl, tert-butyl, isobutyl, phenyl, benzyl, 2-phenylpropyl, trimethoxysilylpropyl, tributoxysilyl-propyl, hydroxymethyl, 2-hydroxyethyl, 2-hydroxypropyl, 2-epoxypropyl, 2-aminoethyl, 2-aminopropyl, methoxymethyl, 2-methoxyethyl, 2-ethoxyethyl, 2-methoxy-propyl, heptafluoropropyl;

$R^1$=hydrogen, methyl, ethyl, propyl, n-butyl, tert-butyl, isobutyl, phenyl, benzyl, 2-phenylpropyl, trimethoxysilylpropyl, tributoxysilylpropyl, hydroxymethyl, 2-hydroxyethyl, 2-hydroxypropyl, 2-epoxypropyl, 2-aminoethyl, 2-aminopropyl, methoxymethyl, 2-methoxyethyl, 2-ethoxyethyl, 2-methoxypropyl, haptafluoropropyl;

$R^2$=2,4-dimethylpentanenitrile, 2-methylbutanenitrile, 2-methylpropanenitrile, cyclohexanecarbonitrile, 4-cyanopentanoic acid, N,N'-dimethyleneisobutyramidine, N,N'-dimethyleneisobutyramidine hydrochloride, 2-amidinopropane, 2-amidinopropane hydrochloride, 2-methyl-N-[1,1-bis(hydroxymethyl)ethyl] propionamide, 2-methyl-N-[1,1-bis(hydroxymethyl)-2-hydroxyethyl] propionamide, 2-methyl-N-(2-hydroxyethyl) propionamide, isobutyamide hydrate, hydroxyl, sulfate;

$R^3$=1,1-bis(carboethoxy)ethyl, 1,1-bis(carbomethoxy) ethyl, bis(carboethoxy)methyl, bis(carbomethoxy)methyl, 1-carboethoxy-1-phenyl ethyl, 1-carbomethoxy-1-phenyl ethyl, chlorine, bromine, fluorine, iodine, 1-methyl-1-[carbo (2-epoxypropoxy)]ethyl, 1-methyl-1-[carbo(2-hydroxyethoxy)]ethyl, 1-methyl-1-[carbo(4-hydroxybutoxy)]ethyl, 1-methyl-1-[carbo(2-aminoethoxy)] ethyl, 1-methyl-1-[carbo(3-trimethoxysilylpropoxy)]ethyl, 1-methyl-[carbo(3-triethoxysilylpropoxy)]ethyl, 1-methyl-1-[carbo(3-dimethoxyethoxysilylpropoxy)]ethyl, 1-methyl-1-[carbo(2-methoxyethoxy)]ethyl, (N,N-di-methylamino) (cyano) methyl, N,N-dimethylamino-(benzo)methyl, thiomethyl(cyano)methyl, thioethyl(cyano)methyl; and $n \geq 1$ and when "n" is greater than 1 the repeat units can be the same or different.

DETAILS OF THE INVENTION

Figure 1:
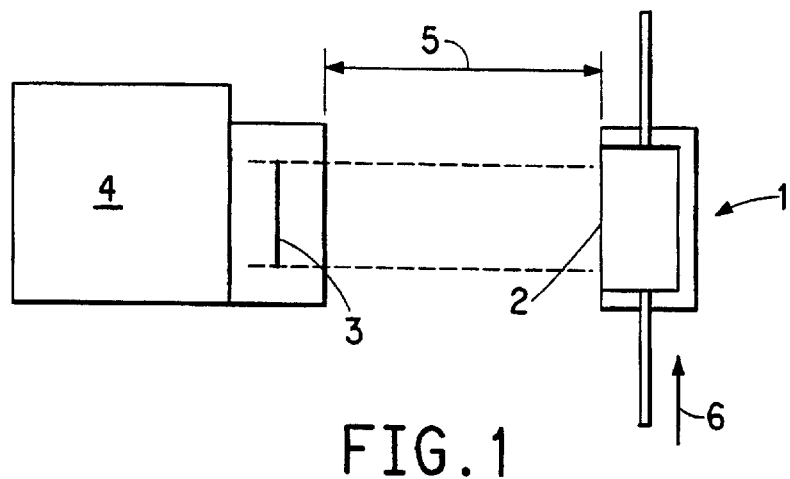
FIGS. 1, 2 and 3 depict representative apparatus arrangements for the source of radiation used to polymerize the photopolymers described herein. The Figures are referred to in the Examples which follows.

Compounds (II), (III) and (VI) can be prepared by the several methods disclosed in U.S. Pat. No. 5,385,996. Examples of Formula (V) addition-fragmentation chain transfer agents can be found in "Diene-Functional Macromonomers by a Single-Step Free Radical Addition-Fragmentation Reaction, Synthesis and Kinetics", Reghunadhannair, C. P. et al, J. Polym. Sci., Part A, Vol 33, 2773, (1995). Two convenient methods of preparing compounds of structure (VII) are by free radical polymerization in the presence of cobalt transfer agents or organic transfer agents that are capable of chain transfer by addition fragmentation.

Cobalt chain transfer agents represent a broad class of complexes. A non-restrictive example of members of this class of transfer agents are described in U.S. Pat. Nos. 4,694,054, 4,680,352, 4,722,984 and WO 87/03605.

Organic chain transfer agents include allylic sulfides, allylic bromides, vinyl terminated methacrylic oligomers (dimers, trimers, etc. or distributions), α-methylstyrene dimer and related compounds. Other methods of preparation are also possible.

Compounds of structure (VII) can also be a block copolymer and the process can then be used to form tri- or multiblock copolymers.

Substituents Y and $Y^2$ convey reactivity to the double bond in radical polymerization of the desired monomer or monomers under polymerization conditions. Y and $Y^2$ are preferably aryl, $CO_2H$, $CO_2R$, CN, or $CONR_2$ in the case of activated monomers (e.g., styrene, acrylics) or H, R, OR, $O_2CR$, or halogen in the case of non-activated monomers (e.g., vinyl acetate, vinyl chloride).

The substituents Y, $Y^1$ and substituted R, $R^1$, $R^2$, $R^3$ and Z can also be chosen to introduce any required end-group functionality into the polymer. These end groups can be the same or different and can be chosen such that the final polymer is a telechelic polymer. Suitable end groups are those compatible with free radical polymerization and include epoxy, hydroxy, carboxylic acid, carboxylic ester. Monomers $CH_2$=CQY as used herein include acrylic, methacrylic and styrene monomers, mixtures thereof, and mixtures of these monomers with other monomers. As one skilled in the art will recognize, the choice of comonomers is determined by the steric and electronic properties of the monomer. The factors which determine copolymerizability of various monomers is well documented in the art. For example, see: Young, L. J. in Polymer Handbook; Brandup, J., and Immergut, E. H.; Wiley; New York, 1975.

In a preferred process, the photoinitiator is selected from one or more of the following initiators:

2,2'-azobis(isobutyronitrile), 2,2'-azobis(2-butanenitrile), 4,4'-azobis(4-cyanpentanoic acid), 1,1'-azobis (cyclohexanecarbonitrile), 2-(t-butylazo)-2-cyanopropane, 2,2'-azobis[2-methyl-N-(1,1)-bis(hydroxymethyl)-2-hydroxyethyl] propionamide, 2,2'-azobis[2-methyl-N-hydroxyethyl)]propionamide, 2,2'-azobis(N,N'-dimethylene-isobutyramidine) dichloride, 2,2'-azobis(2-amidinopropane) dichloride, 2,2'-azobis(N,N'-dimethyleneisobutyramide), 2,2'-azobis(2-methyl-N-[1,1-bis(hydroxymethyl)-2hydroxyethyl] propionamide), 2,2'-azobis(2-methyl-N-[1,1-bis(hydroxymethyl) ethyl] propionamide), 2,2'-azobis(2-methyl-N-(2-hydroxyethyl) propionamide], and 2,2'-azobis(isobutyramide) dihydrate.

The photoinitiators, which are effective in the instant process have a molecular extinction coefficient ε ranging from 0.1 to 2000 and at least one maximum of absorption causing α-cleavage of the initiator compound in the range from 305 to 450 nm.

These are especially compounds of the α-hydroxyketone type, phosphorus containing photoinitiators as well as the mixture of α-hydroxyketone compounds with phosphorous containing photoinitiators. Especially preferred is a process, wherein a photoinitiator or a photoinitiator mixture having a molar extinction coefficient ε from 0.1–2000 is employed.

Preferred is a process, wherein the photoinitiator is of the Formula VIII:

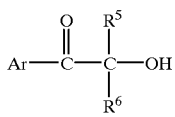

(VIII)

wherein:

Ar is selected from the group consisting of unsubstituted phenyl; phenyl substituted by a member selected from the group consisting of halogen, CN, OH, $C_1$–$C_{17}$ alkoxy, phenoxy, $C_2$–$C_{12}$ alkenyl, —S—$C_1$–$C_{12}$ alkyl, —S-phenyl, —$SO_2$—$C_1$–$C_{12}$ alkyl, —$SO_2$-phenyl, —$SO_2NH_2$, —$SO_2NH$—$C_1$–$C_{12}$ alkyl, —$SO_2$—N($C_1$–$C_{12}$ alkyl)$_2$, —NH—$C_1$–$C_{12}$ alkyl, —N($C_1$–$C_{12}$ alkyl)$_2$, —NH—CO-phenyl, isocyanate, masked isocyanate, unsubstituted $C_1$–$C_{12}$ alkyl, $C_1$–$C_{12}$ alkyl substituted by a member selected from the group halogen, OH, CN, $NH_2$, COOH, isocyanate, masked isocyanate, alkenyl, and masked alkenyl; thienyl; pyridyl; furyl; indanyl; and tetrahydronaphthyl;

$R^5$ is selected from the group consisting of unsubstituted $C_1$–$C_8$ alkyl; $C_1$–$C_8$ alkyl substituted by a member selected from the group consisting of OH, CN, $NH_2$, —$NHC_1$–$C_{12}$ alkyl, N($C_1$–$C_{12}$ alkyl), NH—CO-phenyl, isocyanate, masked isocyanate, $C_2$–$C_{12}$ alkenyl, halogen, $C_1$–$C_{12}$ alkoxy, COOH, —(CO)O—$C_1$–$C_{12}$ alkyl, —O—(CO)—$C_1$–$C_8$ alkyl, and $NR^7R^8$; $C_3$–$C_5$ alkenyl; cyclopentyl; cyclohexyl; and phenyl-$C_1$–$C_3$ alkyl;

$R^6$ is a member selected from any $R^5$ substituent and —$CH_2CH_2R_5$; or $R^6$ together with $R^5$ is selected from the group unsubstituted $C_2$–$C_8$ alkylene, $C_3$–$C_9$ oxaalkylene, $C_3$–$C_9$ azaalkylene, and exomethylene cyclohexane ring; and an $C_2$–$C_8$ alkylene, $C_3$–$C_9$ oxaalkylene, $C_3$–$C_9$ azaalkylene, and exomethylene cyclohexane ring each of which is substituted by a member selected from the group OH, CN, halogen, $C_1$–$C_{12}$ alkoxy, —(CO)O—$C_1$–$C_{12}$ alkyl, —O—(CO)—$C_1$–$C_8$ alkyl and $NR^7R^8$;

$R^7$ is selected from the group consisting of unsubstituted $C_1$–$C_{12}$ alkyl; $C_2$–$C_4$ alkyl substituted by a member selected from the group OH. $C_1$–$C_8$ alkoxy and CN; $C_3$–$C_5$ alkenyl; cyclohexyl; phenyl-$C_1$–$C_3$ alkyl; unsubstituted phenyl; phenyl substituted by a member selected from the group consisting of Cl, $C_1$–$C_4$ alkyl, OH, $C_1$–$C_4$ alkoxy, and —(CO)O—$C_1$–$C_8$ alkyl;

$R^8$ is selected from the group consisting of unsubstituted $C_1$–$C_{12}$ alkyl; $C_2$–$C_4$ alkyl substituted by a member selected from the group consisting of OH, $C_1$–$C_8$ alkoxy, and CN; $C_3$–$C_5$ alkenyl; cyclohexyl; and phenyl-$C_1$–$C_3$ alkyl; or $R^8$ together with $R^7$ is selected from the group $C_4$–$C_5$ alkylene and $C_4$–$C_5$ alkylene interrupted by a member selected from the group —O— and —$NR^{10}$—; or $R^8$ together with $R^6$ is selected from the group $C_1$–$C_9$ alkylene, $C_2$–$C_3$ oxaalkylene and $C_2$–$C_3$ azaalkylene;

$R^9$ is selected from the group consisting of CO—$NH_2$, —CO—NH—$C_1$–$C_8$ alkyl, —CO—N($C_1$–$C_8$ alkyl)$_2$, —P(O)(O—$C_1$–$C_8$ alkyl)$_2$ 2-pyrridyl, and 2-oxo-1-pyrroldinyl; and $R^{10}$ is selected from the group consisting of $C_1$–$C_4$ alkyl, —$CH_2CH_2CN$ and —$CH_2CH_2$(CO)O—$C_1$–$C_8$ alkyl.

Additional substituent information is as follows:

$C_1$–$C_{17}$ alkoxy is linear or branched and is for example $C_1$–$C_{12}$ alkoxy, $C_1$–$C_8$- or $C_1$–$C_6$ alkoxy, especially $C_1$–$C_4$ alkoxy. Examples are methoxy, ethoxy, propoxy, isopropoxy, n-butyloxy, sec-butyloxy, iso-butyloxy, tert-butyloxy, pentyloxy, hexyloxy, heptyloxy, 2,4,4-trimethylpentyloxy, 2-ethylhexyloxy, octyloxy, nonyloxy, decyloxy, dodecloxy, tetradecyloxy, pentadecyloxy, hexadecyloxy or heptadecyloxy especially methoxy, ethoxy, propoxy, isopropoxy, n-butyloxy, sec-butyloxy, iso-butyloxy, tert-butyloxy preferably methoxy.

$C_1$–$C_{12}$ alkoxy, $C_1$–$C_8$ alkoxy and $C_1$–$C_4$ alkoxy have the same meanings as given above up to the appropriate number of C-atoms.

$C_2$–$C_{12}$ alkenyl is one or more times unsaturated and is for example $C_2$–$C_8$-alkenyl, $C_2$–$C_6$- or $C_3$–$C_5$-alkenyl, especially $C_2$–$C_4$-alkenyl. Examples are allyl, methallyl, 1,1-dimethylallyl, 1-butenyl, 3-butenyl, 2-butenyl, 1,3-pentadienyl, 5-hexenyl, 7-octenyl, nonenyl, dodecenyl, especially allyl.

$C_3$–$C_5$ alkenyl has the same meanings as given above up to the appropriate number of C-atoms.

$C_1$–$C_{12}$ alkyl is linear or branched and is for example $C_1$–$C_{10}$, $C_1$–$C_8$- or $C_1$–$C_6$ alkyl, especially $C_1$–$C_4$ alkyl. Examples are methyl, ethyl, propyl, isopropyl, n-butyl, sec-butyl, iso-butyl, tert-butyl, pentyl, hexyl, heptyl, 2,4,4-trimethyl-pentyl, 2-ethylhexyl, octyl, nonyl, decyl, undecyl or dodecyl, preferably methyl or butyl.

$C_1$–$C_8$ alkyl and $C_2$–$C_4$ alkyl have the same meanings as given above up to the appropriate number of C-atoms.

In the terms —S—$C_1$–$C_{12}$ alkyl, —$SO_2$—$C_1$–$C_{12}$ alkyl, —COO—$C_1$–$C_{12}$ alkyl, —$SO_2NH$—$C_1$–$C_{12}$ alkyl, —$SO_2$—N($C_1$–$C_{12}$-alkyl)$_2$, —NH—$C_1$–$C_{12}$ alkyl and —N($C_1$–$C_{12}$ alkyl)$_2$, $C_1$–$C_{12}$ alkyl has the meanings given above. In the groups —O—(CO)—$C_1$–$C_8$ alkyl, —CO—NH—$C_1$–$C_8$ alkyl, —CO—N($C_1$–$C_8$ alkyl)$_2$, —$CH_2CH_2$(CO)O—$C_1$–$C_8$ alkyl and —P(O)(O—$C_1$–$C_8$ alkyl)$_2$ $C_1$–$C_8$ alkyl has the same meanings as given above. If $C_1$–$C_{12}$ alkyl is substituted with halogen, there can be 1 to 3 such halogen substituents.

The term "masked isocyanate" means a protected isocyanate group, namely an isocyanate group, which is blocked by chemical groups, which under specific reaction conditions can be removed. So, the formation of an oxime results in a masked isocyanate group. Examples are given, for example in J. Coatings Technology, Vol. 61, No. 775 (August 1989). The blocking/deblocking mechanism is, for example, demonstrated by the following equation:

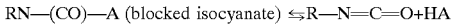

RN—(CO)—A (blocked isocyanate) ⇌ R—N=C=O+HA

On the left side, the blocked isocyanate is not susceptible to reactions in the formulation, while on the right side the influence of temperature (>120° C.) deblocks HA and liberates the isocyanate group, which is now able to take part in further reactions, for example with crosslinkers. Suitable blocking agents HA are, for example, phenol, caprolactam, methyl ethyl ketoxime and diethyl malonate.

Phenyl-$C_1$–$C_3$ alkyl is, for example, benzyl, phenylethyl, α-methylbenzyl, phenylpropyl, or α,α-dimethylbenzyl, especially benzyl.

$C_2$–$C_8$ alkylene is linear or branched alkylene as, for example, methylene, ethylene, propylene, 1-methylethylene, 1,1-dimethylethylene, butylene, 1-methylpropylene, 2-methylpropylene, pentylene, hexylene, heptylene or octylene, especially hexylene.

$C_4$–$C_5$ alkylene is linear or branched, for example, 1,1-dimethylethylene, butylene, 1-methylpropylene, 2-methylpropylene or pentylene.

$C_4$–$C_5$ alkylene, which can be interrupted by —O— or —$NR^{10}$—, is, for example, —$CH_2CH_2$—O—$CH_2CH_2$—, —$CH_2CH_2$—($NR^{10}$)—$CH_2CH_2$—, —$CH_2$—O—$CH_2CH_2CH_2$—, —$CH_2$—($NR^{10}$)—$CH_2CH_2CH_2$ or —$CH_2CH_2$—O—$CH_2CH_2CH_2$—.

$C_3$–$C_9$ oxaalkylene can contain, for example, 1–3 or 1 or 2 O-atoms, especially 1 O-atom and means for example, —$CH_2$—O—$CH_2$—, —$CH_2CH_2$O—$CH_2CH_2$—, —$CH_2$—CH($CH_3$)—O—$CH_2CH_2CH_2$— or —[$CH_2CH_2$O]$_y$—, wherein y=1–4.

$C_1$–$C_9$ azaalkylene can contain, for example, 1–3 or 1 or 2 ($NR^{10}$)-groups, especially 1 such group and means, for example, —$CH_2$—($NR^{10}$)—$CH_2$—, —$CH_2CH_2$—($NR^{10}$)—$CH_2CH_2$—, $CH_2$—CH($CH_3$)—($NR^{10}$)—$CHCH_2CH_2$— or —[$CH_2CH_2(NR^{10})$]$_y$, wherein y=1–4 and wherein $R^{10}$ has the meanings given above.

The exomethylene cyclohexane ring has the following structure

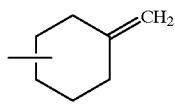

Halogen is fluorine, chlorine, bromine and iodine, especially chlorine and bromine, preferably chlorine.

Preferably Ar in the Formula VIII is unsubstituted phenyl or phenyl substituted by $C_1$–$C_{12}$ alkyl or phenyl substituted by $C_1$–$C_4$ alkyl, which is substituted with OH.

$R^5$ and $R^6$ are $C_1$–$C_4$ alkyl, or $R^5$ together with $R^5$ and the C-atom to which they are bonded, are $C_2$–$C_8$ alkylene.

Suitable compounds of the Formula VIII are phenyl-1-hydroxycyclohexylketone (Irgacure® 184; Ciba-Geigy AG); 4-dodecylphenyl-2-hydroxy-prop-2-yl ketone; 4-isopropylphenyl-2-hydroxy-prop-2-yl ketone; 2-hydroxy-2-methyl-1-phenyl-propanone; [4-(2-hydroxyethyl)-phenyl]-2-hydroxy-prop-2-yl ketone; 4-methylphenyl-2-hydroxy-prop-2-yl ketone [4-(2-carboxyethyl)-phenyl]-2-hydroxy-prop-2-yl ketone.

Especially preferred are phenyl-1-hydroxycyclohexylketone, 2-hydroxy-2-methyl-1-phenylpropanone, [4-(2-hydroxyethyl)-phenyl]-2-hydroxy-prop-2-yl ketone and [4-(2-carboxyethyl)phenyl]-2-hydroxy-prop-2-yl ketone.

The photoinitators according to the Formula VIII are known, some of the compounds are commercially available and the art-skilled is familiar with their preparation. The compounds and their preparation are, for example, disclosed in U.S. Pat. Nos. 4,308,400; 4,315,807; 4,318,791; 4,721,734; 4,347,111; 4,477,681; 4,861,916; 5,045,573.

Further preferred is a process wherein the photoinitiator is a mixture of at least one compound of the Formula VIII and at least one phosphorus-containing photoinitiator of the Formula (Xa) or (Xb)

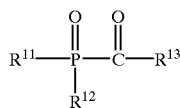

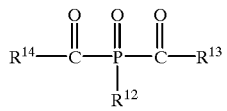

wherein:

$R^{11}$ and $R^{12}$ independently of one another are selected from the group consisting of $C_1$–$C_{18}$ alkyl; and substituted or unsubstituted cyclohexyl, cyclopentyl, phenyl, naphthyl and biphenyl, wherein the substituents are independently selected from the group consisting of halogen. $C_1$–$C_{12}$ alkyl and $C_1$–$C_{12}$ alkoxy, or, $R^{11}$ and $R^{12}$ form a 5- or 6-membered heterocyclic ring containing one of S and N;

$R^{13}$ and $R^{14}$ independently of one another are selected from the group consisting of unsubstituted cyclohexyl, cyclopentyl, phenyl, naphthyl, and biphenyl; and any of said groups substituted by at least one member selected from the group halogen, $C_1$–$C_4$ alkyl and $C_1$–$C_4$ alkoxy; or, $R^{13}$ and $R^{14}$ form a 5- or 6-membered heterocyclic ring containing one of S and N; or $R^{13}$ and $R^{14}$ together with the P-atom to which they are bonded form a ring, which contains from 4 to 10 carbon atoms and which ring is optionally substituted by 1 to 6 $C_1$–$C_4$ alkyl radicals.

$C_1$–$C_{18}$ alkyl is branched or unbranched alkyl and is, for example, $C_1$–$C_{12}$-, $C_1$–$C_{10}$-, $C_1$–$C_8$- or $C_1$–$C_6$-alkyl, especially $C_1$–$C_4$ alkyl. Examples are methyl, ethyl, propyl, isopropyl, n-butyl sec-butyl, tert-butyl, pentyl, hexyl, heptyl, octyl, 2-ethylhexyl, 2,4,4-trimethyl-pentyl, decyl, dodecyl, tetradecyl, heptadecyl or octadecyl.

$C_1$–$C_{12}$ alkyl has the same meanings as given above up to the appropriate number of C-atoms.

$R^{12}$ can be $C_4$–$C_8$ alkyl, for example n-butyl, tert-butyl, isobutyl, sec-butyl, n-octyl, 2,4,4-trimethylpentyl.

$C_1$–$C_{12}$ alkoxy is linear or branched and is for example $C_1$–$C_8$- or $C_1$–$C_6$ alkoxy, especially $C_1$–$C_4$ alkoxy. Examples are methoxy, ethoxy, propoxy, isopropoxy, n-butyloxy, sec-butyloxy, isobutyloxy, tert-butyloxy, pentyloxy, hexyloxy, heptyloxy, 2,4,4-trimethylpentyloxy, 2-ethylhexyloxy, octyloxy, nonyloxy, decyloxy or dodecyloxy, especially methoxy, ethoxy, propoxy, isopropoxy, n-butyloxy, sec-butyloxy, iso-butyloxy tert-butyloxy, preferably methoxy.

Halogen is fluorine, chlorine, bromine and iodine, especially chlorine and bromine, preferably chlorine.

Naphthyl means α-naphthyl and β-naphthyl.

Substituted cyclopentyl, cyclohexyl, phenyl, naphthyl or biphenyl have, for example 1–5, 1–4, three, two or one substituents. For substituted phenyl the substitution in 4-, 2,5-, 2-, 2,6- or 2,4,6-position is preferred. Examples for such groups are 4-chlorophenyl, 2,6-dichlorophenyl, 2,4,6-trichlorophenyl, difluorophenyl, 2-tolyl, 4-tolyl, ethylphenyl, tert-butylphenyl, dodecylphenyl, 4-methoxyphenyl, 2-methoxyphenyl, 2,6-dimethoxyphenyl, ethoxyphenyl, hexyloxyphenyl, 2,4-dimethylphenyl, 2,4,6-trimethylphenyl, methylnaphthyl, isopropylnaphthyl, chloronaphthyl or ethoxynaphthyl. Furthermore, such groups are, for example, methoxyethylphenyl, ethoxymethylphenyl.

$R^{13}$ and $R^{14}$ preferably are substituted phenyl, for example 2,6-dimethoxyphenyl, 2,6-dichlorophenyl, 2,4,6-trimethylphenyl, especially 2,4,6-trimethylphenyl.

A 5- or 6-membered S- or N-containing heterocyclic ring is, for example, thienyl, pyrryl, pyrazolyl, thiazolyl, pyridyl or 1,3-, 1,2- or 1,4-diazyl, preferably thienyl or pyrryl.

If $R^{13}$ and $R^{14}$ together with the P-atom to which they are bonded form a ring containing 4 to 10 C-atoms, this ring is monocyclic, bicyclic or tricyclic. A monocyclic ring formed by $R^{13}$ and $R^{14}$ together with the P-atom is preferably a phosphacyclopentane ring. A bicyclic ring formed by $R^{13}$ and $R^{14}$ together with the P-atom is preferably a phosphabicyclohexane or phosphabicyclononane ring. A tricyclic ring formed by $R^{13}$ and $R^{14}$ together with the P atom is preferably a (6H)-dibenzo[c,e][1,2]oxaphosphorine ring.

$R^{13}$ and $R^{14}$ are preferably 2,6-dimelhoxyphenyl, 2,6-dimethylphenyl, 2,6-dichlorophenyl or especially 2,4,6-trimethylphenyl.

$R^{11}$ and $R^{12}$ preferably are $C_1$–$C_{18}$ alkyl, cyclohexyl, cyclopentyl, phenyl or phenyl substituted with $C_{1-4}$ alkyl. Specifically preferred $R^{11}$ and $R^{12}$ are n-butyl, tert-butyl, isobutyl, sec-butyl, n-octyl, 2,4,,4-trimethylpentyl, phenyl or 2,5-dimethylphenyl.

The photoinitators according to the formulae Xa and Xb are known, some are commercially available compounds and the art-skilled is familiar with their preparation. The compounds and their preparation are, for example, disclosed in U.S. Pat. Nos. 4,792,632; 4,737,593; 4,298,738; 5,218,009; 5,399,770; 5,472,992.

Suitable compounds of the formula Xa and Xb are 2,4,6-trimethylbenzoyl-diphenyl-phosphine oxide; bis(2,4,6-trimethylbenzoyl)-2,5-di(3-methyl-but-1-oxy)phenyl-phosphine oxide; bis(2,4,6-trimethylbenzoyl)-2,5-dipentoxyphenyl-phosphine oxide; bis(2,4,6-trimethylbenzoyl)-2-methyl-prop-1-yl-phosphine oxide; bis(2,6-dimethoxybenzoyl)-2,4,4-trimethylpent-1-yl-phosphine oxide; bis(2,4,6-trimethylbenzoyl)-phenyl phosphine oxide.

Examples for photoinitiator mixtures suitable for the instant processes are a mixture of bis(2,6-dimethoxybenzoyl)-2,4,4-trimethylpent-1-yl-phosphine oxide with 2-hydroxy-2-methyl-1-phenyl-propanone; a mixture of 2-hydroxy-2-methyl-1-phenyl-propanone with (2,4,6-trimethylbenzoyl)-diphenyl phosphine oxide; a mixture of phenyl-1-hydroxycyclohexylketone with bis(2,6-dimethoxybenzoyl)-2,4,4-trimethylpent-1-yl-phosphine oxide; a mixture of phenyl-1-hydroxycyclohexylketone with bis(2,4,6-trimethylbenzoyl)-2-methyl-prop-1-yl-phosphine oxide; a mixture of phenyl-1-hydroxcyclohexylketone with bis(2,4,6-trimethylbenzoyl)-phenyl phosphine oxide; a mixture of phenyl-1-hydroxycyclohexylketone with bis(2,4,6-trimethylbenzoyl)-2,4-dipentoxyphenyl-phosphine oxide; a mixture of 2-hydroxy-2-methyl-1-phenyl-propanone with bis(2,4,6-trimethylbenzoyl)-2-methyl-prop-1-yl-phosphine oxide; a mixture of 2-hydroxy-2-methyl-1-phenyl-propanone with bis(2,4,6-trimethylbenzoyl)phenyl phosphine oxide; a mixture of 2-hydroxy-2-methyl-1-phenyl-propanone with bis(2,4,6-trimethylbenzoyl)-2,4-dipentoxyphenyl-phosphine oxide.

The range of the α-hydroxyketone photoinitiator, compounds of the Formula (VIII) respectively, in the mixtures of these compounds with phosphorus-containing photoinitiators, compounds of the Formula Xa or Xb respectively, is, for example, 50–95% by weight. Preferably the amount of the compounds of the Formula (VIII) in the mixture is 50–75%, especially 75% (based on 100% by weight of the total mixture).

Of interest is a process wherein the Formula (VIII) Ar is unsubstituted phenyl or phenyl substituted by $C_1$–$C_{12}$ alkyl, which $C_1$–$C_{12}$ alkyl is unsubstituted or substituted by OH or COOH, $R^5$ and $R^6$ are $C_1$–$C_{18}$ alkyl or $R^5$ together with $R^6$ is $C_2$–$C_8$ alkylene; and wherein the formula Xa or the formula Xb $R^{11}$ and $R^{12}$ independently of one another are $C_1$–$C_{12}$ alkyl or phenyl; wherein the phenyl is unsubstituted or substituted by $C_1$–$C_8$ alkyl and/or $C_1$–$C_8$ alkoxy and $R^{13}$ and $R^{14}$ independently of one another are phenyl, which is substituted by halogen, $C_1$–$C_4$ alkyl and/or $C_1$–$C_4$ alkoxy.

Preferred is, for example, a mixture of 2-hydroxy-2-methyl-1-phenyl-propanone with bis(2,6-dimethoxybenzoyl)-2,4,4-trimethylpent-1-yl-phosphine oxide. Especially preferred is the above mixture with an amount of 2-hydroxy-2-methyl-1-phenyl-propanone of 75% by weight.

Also preferred, for example, is a mixture of 2-hydroxy-2-methyl-1-phenyl-propanone with 2,4,6-trimethylbenzoyl-phenyl-phosphine oxide. Especially preferred is the above mixture with an amount of 2-hydroxy-2-methyl-1-phenyl propanone of 50% by weight.

The composition to be (co)polymerized in the instant process expediently contains the photoinitiator of the Formula VIII, Xa or Xb, or the photoinitiator mixture of the compounds of the Formula VIII, Xa or Xb in an amount from 0.1 to 15% by weight, preferably from 0.2 to 5% by weight, based on the total solids content.

An important process aspect is employing a photoinitiator having a long thermal half life. The term "half life" in this connection is directed to the thermal decomposition of the photoinitiator compound in the absence of light. For practical purposes, half lives over 10 hours under operating conditions are adequate. Interesting is therefore a process, wherein a photoinitiator with a thermal "half life" of more than 10 hours at 70° C. is used.

Also important is a process wherein the solvent is an alkane, a ketone, an alcohol, an ester or a mixture thereof. Examples for suitable solvents are petroleum ether (with a boiling range higher than the reaction temperature), or pure alkanes, such as pentane, hexane, octane, isooctane, heptane, or ethyl acetate, propyl, isopropyl, butyl or hexyl acetate, acetone, methylethyl ketone, methanol, ethanol, isopropanol or water. Especially preferred in the instant process are solvents, which are not published in the list of "Hazardous Air Polluting Solvents" (HAPS), that means preferably is conducted in a HAPS-free reaction mixture.

It is also possible to conduct the instant process as an emulsion polymerization. In this case the monomers are diluted in water and emulsifiers are added to the reaction mixture. Optionally, solvents can be used. The process as described above also can be conducted as a suspension or solution polymerization.

The polymers prepared by the instant process can be used for the production of printing inks, varnishes, white paints, coating compositions, inter alia, for paper, wood, metal or plastic, for the production of colored pigmented paints, daylight-curable coatings for buildings and road markings, for the preparation of clear or pigmented aqueous dispersions, for the production of priming plates, for the production of masks for screen printing, as dental filling materials, for adhesives, etch or permanent resists and of solder stop masks for printed electronic circuits, for the production of three-dimensional articles by bulk curing (UV curing in transparent moulds) or for the production of formulations used in stereolithography for the preparation of composite materials (for example styrenic polyesters, which can contain glass fibers and other assistants) and other thick-layer compositions, for the production of coatings for encapsulation of electronic parts or for the production of coatings for optical fibers.

The Examples below serve to further illustrate the invention. Parts and percentages are by weight unless otherwise specified. Where in the designations of alkyl radicals having more than 3 carbon atoms no specific isomers are indicated, these radicals are in each case the n-isomers. In the following Examples, these photoinitiators and photoinitiator mixtures are among those employed:

Compound A: 1-hydroxycyclohexyl phenyl ketone (Irgacure® 184; Ciba-Geigy)

Compound B: 2-hydroxy-2-methyl-1[4(2-hydroxyethyl)-phenyl]-propanone.

The gas chromatographic analysis (GC), for the determination of residual monomer content, is conducted in a Hewlett-Packard chromatograph (HP 5890 Series II fitted with a HP 3396 Series II integrator. Column characteristics: 30 meters DB5-column J&W Scientific No. 122-503, 0.25 m×30 m.

The photoreactor used is fabricated in Rodoxal, an aluminum alloy but suitable reactor can also be constructed, for example in stainless steel or in any material compatible with the monomers employed, as for example Teflon®, brown glass etc. The reactor possesses a glass window allowing transmission of the UV-light.

The overall irradiation surface of the reactor used to prepare some of the examples of the instant application is 13 $cm^2$ and the cell thickness is 1 cm. In this connection the "overall irradiation surface" of the reactor means the dimension of the irradiated part of the reactor, namely the window and the "cell thickness" is the thickness of the internal path (diameter) of the reactor at the irradiated part. The process can also be carried out using an optical bench and a UV-cell for absorption spectra fitted with a septum to allow reactions under argon; and a magnetic stirrer. This UV-cell, similar to those used to measure UV-spectra, is irradiated through a 2 $cm^2$ window with homogeneous light from a Philips 100 W medium pressure mercury lamp and the cooling is effected through the side walls of the cell.

Use of larger dimensions is possible, as for example an overall irradiation surface (window size) of 26 $cm^2$ with a cell thickness (diameter) of 1 cm. In this case, lamps of higher output and bigger irradiation surfaces such as, for example, Fusion Curing lamps F200 to F600 are used. As those commercially available lamps have a bulb length ranging from 6 inches (about 15.5 cm) for F200 to 10 inches (about 25 cm) for F600, the reactor should not exceed this height. The irradiation surface can thus be adapted to the necessary reaction conditions to provide a controllable and homogenic generation of radicals of the photoinitiator throughout the reactor, which is achieved, by controlling the flow of the mixture and the distribution of radicals in the mixture by stirring and appropriate irradiation. This is not dependent on the size of the reactor or the irradiation surface. One skilled in the art will know the type of apparatus that can be used in the process of this invention, especially in view of the details provided in this disclosure.

Figure 2:
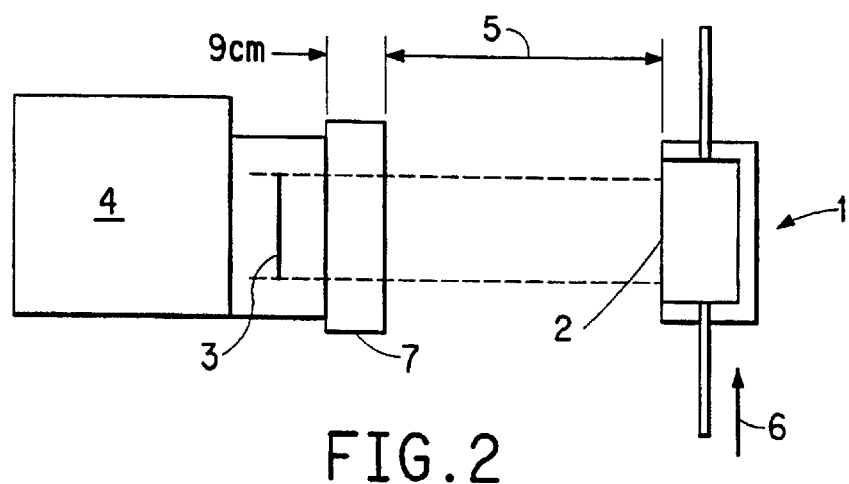
Figure 3:
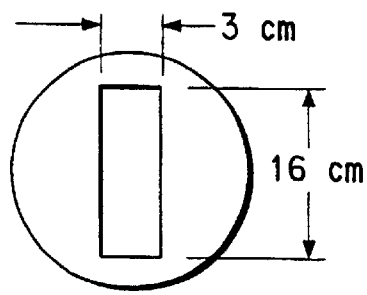

In FIGS. 1 to 3, the reactors employed to prepare the Examples of the invention are shown. Two different set-ups were used.

FIG. 1 shows the side view of the first representative set-up. Through the reactor (1) a homogeneous flow of the monomers to be polymerized is indicated by (6). The light emitted from the lamp (3)—a F200 Fusion irradiation set—reaches the polymerizable mixture through the reactor window (2). The lamp is a H or D-bulb fusion lamp with 6 inches (about 15.5 cm) length. (4) designates the power supply of the fusion lamp. The values for the distance (5) between the lamp and the reactor window vary and are indicated specifically in the Examples.

FIG. 2 gives a side view of the second representative set-up. Elements (1) to (6) are as described for FIG. 1. The difference between set-ups lies in feature (7), which is a copper can wrapping the outlet of the light, and wherein the light only comes out of a slot. FIG. 3 gives the front view of this wrapping, showing the slot and its dimensions. In this case, a F300 Fusion irradiation set was used.

Advantageously, the process of the invention is carried out in an inert gas atmosphere using, for example, argon or nitrogen as protective gas. To allow the solution to be properly mixed and irradiated in a homogenic fashion, it is circulated through the cell for example by a magnet driven gear pump at a constant speed. The circulation can be regulated by any device suitable to guarantee a homogeneous reaction mixture. In the Examples of the instant application, a flow speed of 100 ml/min is used. The circulation speed is not critical with respect to the formation of the radicals. With stirring, a proper mixing and homogeneous radical concentration is achieved. Practically, the circulation speed is responsible for taking care of exotherms. This means that at the beginning of the reaction under constant irradiation condition, the slower the circulation speed, the more radicals are produced per path, which results in more reaction and a higher polymerization rate, which translates to higher exotherms. On the other hand, at the beginning of the reaction the faster the speed, the lower the radical generation and the lower the temperature rises. These effects can be leveled out with appropriate cooling.

Preferably, the light needed for the irradiation is homogeneous. It can be obtained with different light sources by conventional methods known to those skilled in the art. For example, the light emitted from a bulb and falling onto the reactor is collimated by a semi-elliptical reflector. This light is homogenous enough for the inventive process and allow less than 10% discrepancy of intensity between different measurement points of the irradiated window surface. It is not imperative to place the reactor in the focus of the reflector as long as the intensity and homogenity of the light is sufficient to help generate a homogeneous potential of radicals in the reactor and as long as the homogenous distribution of the radicals in the reactor is controlled by appropriate stirring.

To avoid absorption of light by the monomer itself, optionally a filter cutting all radiations below a certain wavelength can be placed between the light source and the reactor. Filters, for example, from the company Schott, e.g., WG 305, WG 320, WG 335 or WG 345, are suitable for the process.

For the irradiation of the reaction mixture in the instant process light emitting radiation of the wavelengths from 305 nm to 450 nm is used. Preferably, the process is conducted employing wavelengths from 335–400 nm.

Generally, all lamps emitting light in the region where the photoinitiator absorbs and generates the radicals are suitable for the instant process. These can be, for example, medium pressure mercury lamps or microwave-energized Fusion bulbs. The H- D- and M-bulbs (Fusion, Inc.) emit light in the range needed for the instant process. Further, other doped lamps, as for example, metal halide lamps MO 23 and MO 61 can be employed in the instant process. It is also possible to work the instant process with laser light of the corresponding wavelength.

The distance from the lamp to the reactor window determines the amount of light received by the photoinitiators. In addition, an homogeneous light emission, capable of producing a sufficient amount of initiating radicals from the photoinitiator is needed. Normally, the optimal distance depends on the lamp used as well as on the irradiation surface of the reactor.

The duration of the irradiation depends on the desired degree of conversion of the monomers to polymers. This degree can, for example, be determined by gas chromatographic analysis (GC). The irradiation is stopped as soon as the desired degree of conversion is reached.

To insure, that the irradiation of the solution occurs only through the reactor window, the protection from light of the remaining parts of the reactor should be guaranteed by usual means like, for example, brown glass, steel tubing or aluminum foil.

The solution actually being irradiated is kept at a relatively constant temperature in the reactor cell, for example, by using a cryostat or other means for controlling temperatures. To insure control of the final properties of the polymer, the temperature of the reaction solution is kept within 2.5° C. of the desired reaction temperature (e.g., 25° C.±2.5° C.). Usually, the reaction temperature is kept between −20° C. and +70° C., for example, from 0° C. to +50° C., preferably from +25° C. to +50° C. It is also possible to let the temperature increase, for instance if a higher polymerization rate is wanted.

Generally, the solids content in the final polymer solution is ≦80 percent. The gel permeation chromatographic analysis (GPC), for the determination of $M_w$ and dispersity is also conducted with a Hewlett-Packard HP 1090 fitted with a RI-detector HP 1037 or 1047. The columns used are Ultrastyragel® $10^3$–$10^6$ Angstrom.

Also used for GPC: a modular system of Ergatech consisting of a Rheos 4000 pumping unit, an ERC7515A RI-detector, a Spark-Holland Marathon injector and using PL 5µ MixedC columns from Polymer Laboratory.

EXAMPLES

Chain Transfer Agents

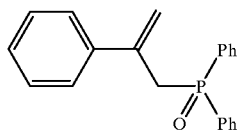
C

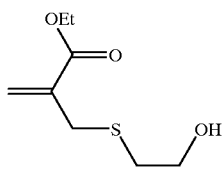
D

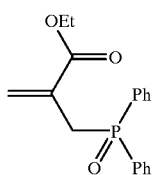
E

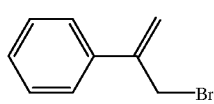
F

-continued

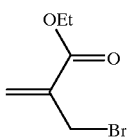
G

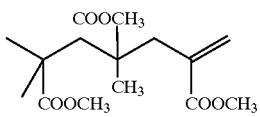
H

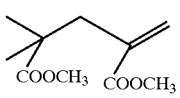
I

Methyl Acrylate: Photoinitiator B
(Control 1)

A mixture of 0.45 g of photoinitiator B (0.5% on solution), 18 g of methyl acrylate and 7.55 g butylacetate is prepared and irradiated under inert gas for 48 minutes at 25° C. with a 6 inch Fusion D-bulb in a 26 cm² reactor. The distance between the light source and the reactor is fixed at 12 cm. Further, a 345 nm-cut-off-filter was used. See FIG. 2.

At the end of the reaction, the lamp is switched off and some hydroxymethylhydroquinone (HMHQ) dissolved in butyl acetate is added to prevent further polymerization reactions. The obtained colorless solution is then submitted to GC analysis to determine the residual monomer content and to GPC analysis for the determination of molecular weight. The weight average molecular weight (Mw) of the polymer obtained is 14400, the polydispersity value (Mw/Mn) is 1.8. The degree of conversion of the monomers, determined by GC, is 97%.

Example 1

Addition of 0.1% of D

A mixture of 0.45 g of photoinitiator B (0.5% solution), 18 g of methyl acrylate, 90 mg of D and 71.5 g butylacetate is prepared and irradiated under inert gas for 48 minutes at 25° C. with a 6 inch Fusion D-bulb in a 26 cm² reactor. The distance between the light source and the reactor is fixed at 12 cm. Further, a 345 nm-cut-off-filter was used. See FIG. 2.

At the end of the reaction, the lamp is switched off and some hydroxymethylhydroquinone (HMHQ) dissolved in ethylacetate is added to prevent further polymerization reactions. The obtained colorless solution is then submitted to GC analysis to determine the residual monomer content and to GPC analysis for the determination of molecular weight. The weight average molecular weight (Mw) of the polymer obtained is 13500, the polydispersity value (Mw/Mn) is 2.1. The degree of conversion of the monomers is 80%.

Example 2

Addition of 0.5% of D

A mixture of 0.45 g of photoinitiator B (0.5% solution), 18 g of methyl acrylate, 0.45 g of D and 71.1 g butylacetate is prepared and irradiated under inert gas for 48 minutes at 25° C. with a 6 inch Fusion D-bulb in a 26 cm² reactor. The distance between the light source and the reactor is fixed at 12 cm. Further, a 345 nm-cut-off-filter was used. See FIG. 2.

At the end of the reaction, the lamp is switched off and some hydroxymethylhydroquinone (HMHQ) dissolved in ethylacetate is added to prevent further polymerization reactions. The obtained colorless solution is then submitted to GC analysis to determine the residual momomer content and to GPC analysis for the determination of molecular weight. The weight average molecular weight (Mw) of the polymer obtained is 11000, the polydispersity value (Mw/Mn) is 1.8. The degree of conversion of the monomers as determined by GC is 81%.

Example 3

Addition of 1% of D

A mixture of 0.45 g of photoinitiator B (0.5% solution), 18 g of methyl acrylate, 0.9 g of D and 70.7 g of ethylacetate is prepared and irradiated under inert gas for 48 minutes at 25° C. with a 6 inch Fusion D-bulb in a 26 cm$^2$ reactor. The distance between the light source and the reactor is fixed at 12 cm. Further, a 343 nm-cut-off-filter was used. See FIG. 2.

At the end of the reaction, the lamp is switched off and some hydroxymethylhydroquinone (HMHQ) dissolved in butyl acetate is added to prevent further polymerization reactions. The obtained colorless solution is then submitted to GC analysis to determine the residual monomer content and to GPC analysis for the determination of molecular weight. The weight average molecular weight (Mw) of the polymer obtained is 8000, the polydispersity value (Mw/Mn) is 2.0. The degree of conversion of the monomers is 76%.

Examples 4 to 18

Under similar conditions, Examples 4 to 18 were run to produce polymers with the following additional details:

TABLE

| Example No. | Initiator | Percent Initiator | Monomer | Solvent | % CTA | Mw | Dispersity | Irradiation Time | Conversion |
|---|---|---|---|---|---|---|---|---|---|
| 4 | B | 0.5% | MA | EtOAc | 0.1% | 13600 | 1.8 | 48 mn | 87% |
| 5 | B | 0.5% | MA | EtOAc | 0.5% | 11200 | 1.9 | 48 mn | 77% |
| 6 | B | 0.5% | MA | EtOAc | 1% | 7300 | 2.2 | 48 mn | 67% |
| 7 | B | 0.5% | MA | EtOAc | 0.1% | 13900 | 1.8 | 48 mn | 80% |
| 8 | B | 0.5% | MA | EtOAc | 0.5% | 5200 | 1.7 | 48 mn | 45% |
| 9 | B | 0.5% | MA | EtOAc | 1% | 2100 | 1.6 | 48 mn | 25% |
| 10 | B | 0.5% | MA | EtOAc | 0.1% | 13800 | 2 | 48 mn | 85% |
| 11 | B | 0.5% | MA | EtOAc | 0.5% | 10500 | 2.1 | 48 mn | 50% |
| 12 | B | 0.5% | MA | EtOAc | 1% | 2500 | 1.9 | 48 mn | 34% |
| 13 | B | 0.5% | MA | EtOAc | 0.1% | 12300 | 1.8 | 48 mn | 94% |
| 14 | B | 0.5% | MA | EtOAc | 0.5% | 10600 | 1.9 | 48 mn | 72% |
| 15 | B | 0.5% | MA | EtOAc | 1% | 8000 | 2.2 | 48 mn | 55% |
| 16 | B | 0.5% | MA | EtOAc | 0.1% | 8200 | 1.9 | 48 mn | 98% |
| 17 | B | 0.5% | MA | EtOAc | 0.5% | 6700 | 2 | 48 mn | 89% |
| 18 | B | 0.5% | MA | EtOAc | 1% | 5600 | 2.1 | 48 mn | 81% |

Examples 4 to 6 employ CTA G; 7 to 9 employ F; 10 to 12 employ C; 13 to 15 employ H and 16 to 18 employ E.

Control 2 (MA with Photoinitiator A)

A mixture of 0.18 g of photoinitiator A (0.2% solution), 18 g of methyl acrylate and 71.8 g butylacetate is prepared and irradiated under inert gas for 48 minutes at 25° C. with a 6 inch Fusion D-bulb in a 26 cm$^2$ reactor. The distance between the light source and the reactor is fixed at 26 cm. Further, a 345 nm-cut-off-filter was used. See FIG. 1.

At the end of the reaction, the lamp is switched off and some hydroxymethylhydroquinone (HMHQ) dissolved in butyl acetate is added to prevent further polymerization reaction. The obtained colorless solution is then submitted to GC analysis to determine the residual monomer content and to GPC analysis for the determination of molecular weight. The weight average molecular weight (Mw) of the polymer obtained is 19600, the polydispersity value (Mw/Mn) is 1.5. The degree of conversion of the monomers, determined by GC is 73%.

Example 19

A mixture of 0.18 g of photoinitiator A (0.2% solution), 18 g of methyl acrylate 70.9 g butylacetate and 0.9 g of CTA H is prepared and irradiated under inert gas for 48 minutes at 25° C. with a 6 inch Fusion D-bulb in a 26 cm$^2$ reactor. The distance between the light source and the reactor is fixed at 26 cm. Further, a 345 nm-cut-off-filter was used. See FIG. 1.

At the end of the reaction, the lamp is switched off and some hydroxymethylhydroquinone (HMHQ) dissolved in butyl acetate is added to prevent further polymerization reactions. The obtained colorless solution is then submitted to GC analysis to determine the residual monomer content and to GPC analysis for the determination of molecular weight. The weight average molecular weight (Mw) of the polymer obtained is 7100, the polydispersity value (Mw/Mn) is 1.7. The degree of conversion of the monomers, determined by GC, is 38%.

Control 3

A mixture of 0.18 g of photoinitiator A (0.2% solution), 18 g of methyl acrylate and 71.8 g butylacetate is prepared and irradiated under inert gas for 48 minutes at 60° C. with a 6 inch Fusion D-bulb in a 26 cm$^2$ reactor. The distance between the light source and the reactor is fixed at 26 cm. Further, a 345 nm-cut-off-filter was used. See FIG. 1.

At the end of the reaction, the lamp is switched off and some hydroxymethylhydroquinone (HMHQ) dissolved in butyl acetate is added to prevent further polymerization reaction. The obtained colorless solution is then submitted to GC analysis to determine the residual monomer content and to GPC analysis for the determination of molecular weight. The weight average molecular weight (Mw) of the polymer obtained is 22700, the polydispersity value (Mw/Mn) is 1.6. The degree of conversion of the monomers, determined by GC, is 83%.

Example 20

A mixture of 0.18 g of photoinitiator A (0.2% solution), 18 g of methyl acrylate 70.9 g butylacetate and 0.9 g of CTA H is prepared and irradiated under inert gas for 45 minutes at 60° C. with a 6 inch Fusion D-bulb in a 26 cm$^2$ reactor. The distance between the light source and the reactor is fixed at 26 cm. Further, a 345 nm-cut-off-filter was used. See FIG. 1.

At the end of the reaction, the lamp is switched off and some hydroxymethylhydroquinone (HMHQ) dissolved in butyl acetate is added to prevent further polymerization reactions. The obtained colorless solution is then submitted to GC analysis to determine the residual monomer content and to GPC analysis for the determination of molecular weight. The weight average molecular weight (Mw) of the polymer obtained is 15300, the polydispersity value (Mw/Mn) is 2. The degree of conversion of the monomers, determined by GC, is 65%.

Control 4

A mixture 2.7 g of VAZO® 88(1,1'-azobis (cyanocyclohexane)) (3% solution), 25.2 g of hydroxypropyl acrylate and 7.8 g butyl methacrylate in 24.3 g butylacetate is prepared and irradiated under inert gas for 90 minutes at 70° C. with a 6 inch Fusion D-bulb in a 26 cm² reactor. The distance between the light source and the reactor is fixed at 19 cm. Further, a 345 nm-cut-off-filter was used. See FIG. 1.

At the end of the reaction, the lamp is switched off and some hydroxymethylhydroquinone (HMHQ) dissolved in butyl acetate is added to prevent futher polymerization reactions. The obtained colorless solution is then submitted to GC analysis to determine the residual monomer content and to GPC analysis for the determination of molecular weight. The weight average molecular weight (Mw) of the polymer obtained is 34200, the polydispersity value (Mw/Mn) is 2.2. The degree of conversion of the monomers, determined by GC, is 97%.

Example 21

A mixture 2.7 g of VAZO® 88 (3% solution), 25.2 g of hydroxypropyl acrylate and 37.8 g butyl methacrylate, 2.7 g CTA D in 21.6 g butylacetate is prepared and irradiated under inert gas for 90 minutes at 70° C. with a 6 inch Fusion D-bulb in a 26 cm² reactor. The distance between the light source and the reactor is fixed at 19 cm. Further, a 345 nm-cut-off-filter was used. See FIG. 1.

At the end of the reaction, the lamp is switched off and some hydroxymethylhydroquinone (HMHQ) dissolved in butyl acetate is added to prevent further polymerization reactions. The obtained colorless solution is then submitted to GC analysis to determine the residual monomer content and to GPC analysis for the determination of molecular weight. The weight average molecular weight (Mw) of the polymer obtained is 11200, the polydispersity value (Mw/Mn) is 1.9. The degree of conversion of the monomers, determined by GC, is 93.7%.

Example 22

A mixture 2.7 g of VAZO® 88 (3% solution), 25.2 g of hydroxypropyl acrylate and 7.8 g butyl methacrylate, 2.7 g CTA G in 21.6 g butylacetate is prepared and irradiated under inert gas for 90 minutes at 70° C. with a 6 inch Fusion D-bulb in a 26 cm² reactor. The distance between the light source and the reactor is fixed at 19 cm. Further, a 345 nm-cut-off-filter was used. See FIG. 1.

At the end of the reaction, the lamp is switched off and some hydroxymethylhydroquinone (HMHQ) dissolved in butyl acetate is added to prevent further polymerization reactions. The obtained colorless solution is then submitted to CC analysis to determine the residual monomer content and to GPC analysis for the determination of molecular weight. The weight average molecular weight (Mw) of the polymer obtained is 9000, the polydispersity value (Mw/Mn) is 1.9. The degree of conversion of the monomers, determined by GC, is 86%.

Example 23

A mixture 2.7 g of VAZO® 88 (3% solution), 25.2 g of hydroxypropyl acrylate and 37.8 g butyl methacrylate, 2.7 g CTA I in 21.6 g butylacetate is prepared and irradiated under inert gas for 90 minutes at 70° C. with a 6 inch Fusion D-bulb in a 26 cm² reactor. The distance between the light source and the reactor is fixed at 19 cm. Further, a 345 nm-cut-off-filter was used. See FIG. 1.

At the end of the reaction, the lamp is switched off and some hydroxymethylhydroquinone (HMHQ) dissolved in butyl acetate is added to prevent further polymerization reactions. The obtained colorless solution is then submitted to GC analysis to determine the residual monomer content and to GPC analysis for the determination of molecular weight. The weight average molecular weight (Mw) of the polymer obtained is 24400, the polydispersity value (Mw/Mn) is 2.3. The degree of conversion of the monomers, determined by GC, is 84.5%.

What is claimed is:

1. In a method for photopolymerizing one or more monoethylenically unsaturated monomers having the general structure:

where Q=H, halogen or $CH_3$ and Y=any group which activates the double bond toward radical addition, by:

i) contacting the monomer with a photoinitiator, ii) contacting the monomer/photoinitiator of step (i) with actinic radiation in a photoreactor, and iii) forming a linear polymer of controlled molecular weight;

where Y is selected from the group consisting of COOR, $CONR_2$, OCOR, CN, Cl, $OCO_2R^1$, $OR^1$, and aryl;

R is selected from the group consisting of hydrogen, alkyl, aryl, aralkyl and alkaryl; and $R^1$ is selected from the group consisting of alkyl, aryl, aralkyl and alkaryl; and wherein each of said groups is optionally substituted with one or more functional groups;

the improvement which comprises employing an addition-fragmentation chain transfer agent along with the photoinitiator in step (i) wherein said actinic radiation is homogenous and said photoinitiator has a thermal half life of over 10 hours under operating conditions.

2. The method according to claim 1 employing as the chain transfer agent one or more members selected from the group consisting of:

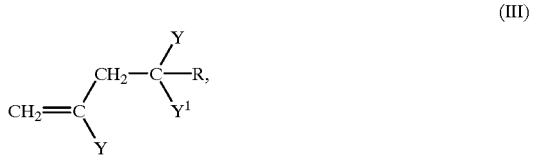

-continued

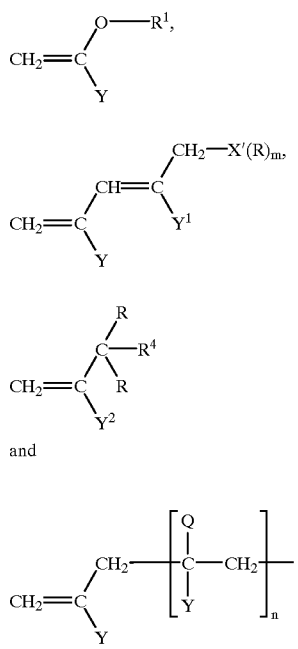

and wherein
  $Y^1$ is the same or different from Y;
  X' is an element other than carbon selected from Groups IV, V, VI or VII of the Periodic Table or a group consisting of an element selected from Groups IV, V or VI to which is attached one or more oxygen atoms;
  $Y^2$ is halogen or $C(R)_2R^4$;
  m is a number from 0 to 3, such that the valency of the group X' is satisfied and, when m is greater than 1, the groups represented by R are the same or different;
  Z is hydrogen, $SR^1$, S(O)R, $S(O)_2R$, R, $R^2$, $R^3$;
  $R^2$ is derived from initiator fragments;
  $R^3$ is a chain transfer agent-derived radical selected from the group consisting of alkyl cycloalkyl, aryl, aralkyl, alkaryl, organosilyl, alkoxyalkyl, alkoxyaryl, and $-P(R)_2$, each of said groups being optionally substituted with a member selected from the group R, COOR, $CONR_2$, OCOR, CN, halogen, $OCO_2R$, OR;
  $R^4$ is chlorine or bromine; and
  $n \geq 1$.

3. The method according to claim 2 employing chain transfer agent II.

4. The method according to claim 2 employing chain transfer agent III.

5. The method according to claim 2 employing chain transfer agent IV.

6. The method according to claim 2 employing chain transfer agent V.

7. The method according to claim 2 employing chain transfer agent VI.

8. The method according to claim 2 employing chain transfer agent VII.

9. The method according to claim 1, employing conditions for emulsion, suspension or solution polymerization.

10. The method according to claim 1, comprising producing a block copolymer.

11. The method according to claim 1 employing as the chain transfer agent one or more members selected from the group consisting of:

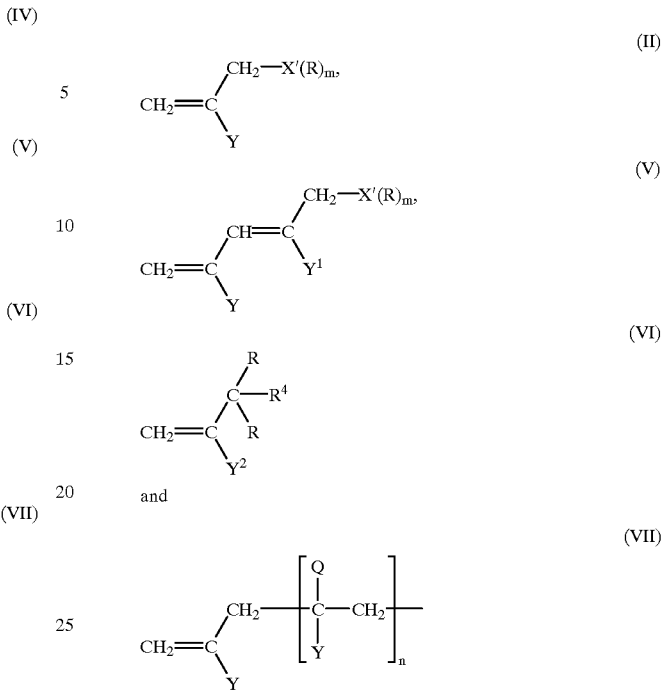

and wherein
  $Y^1$ is the same or different from Y;
  X' is an element other than carbon selected from Groups IV, V, VI or VII of the Periodic Table or a group consisting of an element selected from Groups IV, V or VI to which is attached one or more oxygen atoms;
  $Y^2$ is halogen or $C(R)_2R^4$;
  m is a number from 0 to 3, such that the valency of the group X' is satisfied and, when m is greater than 1, the groups represented by R are the same or different;
  Z is hydrogen, $SR^1$, S(O)R, $S(O)_2R$, R, $R^2$, $R^3$;
  $R^2$ is derived from initiator fragments;
  $R^3$ is a chain transfer agent-derived radical selected from the group consisting of alkyl cycloalkyl, aryl, aralkyl, alkaryl, organosilyl, alkoxyalkyl, alkoxyaryl, and $-P(R)_2$, each of said groups being optionally substituted with a member selected from the group R, COOR, $CONR_2$, OCOR, CN, halogen, $OCO_2R$, OR;
  $R^4$ is chlorine or bromine; and
  $n \geq 1$.

12. The method of claim 1 wherein said actinic radiation is homogeneous enough to allow less than 10% discrepancy of intensity between different measurement points of an irradiated window surface the reactor.

13. The method of claim 1 wherein said actinic radiation is filtered to cut all radiation below certain wavelength from reaching reactor.

14. The method of claim 13 wherein wave length of said actinic radiation ranges from 305 nm to 450 nm.

15. The method of claim 1, 2, 9, 10 or 11 wherein said photoinitiator is 1-hydroxycyclohexyl phenyl ketone or 2-hydroxy-2-methyl-1[4(2-hydroxyethyl)-phenyl]-propanone.

16. The method of claim 1, 2, 9, 10 or 11 wherein said photoinitiator comprises:
  phenyl-1-hydroxycyclohexylketone;
  4-dodecylphenyl-2-hydroxy-prop-2-yl ketone;

4-isopropylphenyl-2-hydroxy-prop-2-yl ketone;

2-hydroxy-2-methyl-1-phenyl-propanone;

[4-(2-hydroxyethyl)-phenyl]-2-hydroxy-prop-2-yl ketone;

4-methylphenyl-2-hydroxy-prop-2-yl ketone; or

[4-(2-carboxyethyl)-phenyl]-2-hydroxy-prop-2-yl ketone.

17. The method of claim 1, 2, 9, 10 or 11 wherein said photoinitiator comprises:

- a mixture of bis(2,6-dimethoxybenzoyl)-2,4,4-trimethylpent-1-yl-phosphine oxide with 2-hydroxy-2-methyl-1-phenyl-propanone;
- a mixture of 2-hydroxy-2-methyl-1-phenyl-propanone with (2,4,6-trimethylbenzoyl)-diphenyl phosphine oxide;
- a mixture of phenyl-1-hydroxycyclohexylketone with bis(2,6-dimethoxybenzoyl)-2,4,4-trimethylpent-1-yl-phosphine oxide;
- a mixture of phenyl-1-hydroxycyclohexylketone with bis(2,4,6-trimethylbenzoyl)-2-methyl-prop-1-yl-phosphine oxide;
- a mixture of phenyl-1-hydroxycyclohexylketone with bis(2,4,6-trimethylbenzoyl)-phenyl phosphine oxide;
- a mixture of phenyl-1-hydroxycyclohexylketone with bis(2,4,6-trimethylbenzoyl)-2,4-dipentoxyphenyl-phosphine oxide;
- a mixture of 2-hydroxy-2-methyl-1-phenyl-propanone with bis(2,4,6-trimethylbenzoyl)-2-methyl-prop-1-yl-phosphine oxide;
- a mixture of 2-hydroxy-2-methyl-1-phenyl-propanone with bis(2,4,6-trimethylbenzoyl) phenyl phosphine oxide; or
- a mixture of 2-hydroxy-2-methyl-1-phenyl-propanone with bis(2,4,6-trimethylbenzoyl)-2,4-dipentoxyphenyl-phosphine oxide.

* * * * *